United States Patent
Yi et al.

(10) Patent No.: US 7,102,724 B2
(45) Date of Patent: Sep. 5, 2006

(54) ALIGN KEY FOR A TOC/COT-TYPE LIQUID CRYSTAL DISPLAY DEVICE AND METHOD OF FABRICATING THE SAME

(75) Inventors: Jong-Hoon Yi, Seoul (KR); Dong-Hoon Lee, Gyeonggi-do (KR)

(73) Assignee: LG.Philips LCD.Co., Ltd., Seoul (KR)

( * ) Notice: Subject to any disclaimer, the term of this patent is extended or adjusted under 35 U.S.C. 154(b) by 0 days.

(21) Appl. No.: 10/327,123

(22) Filed: Dec. 24, 2002

(65) Prior Publication Data

US 2003/0117573 A1    Jun. 26, 2003

(30) Foreign Application Priority Data

Dec. 24, 2001    (KR)    ............ 10-2001-0084258

(51) Int. Cl.
G02F 1/1333 (2006.01)
G02F 1/1339 (2006.01)
G02F 1/1335 (2006.01)
G02F 1/136 (2006.01)

(52) U.S. Cl. .............. 349/158; 349/153; 349/106; 349/44

(58) Field of Classification Search ............... 349/158, 349/153, 106, 42, 187, 44, 190, 110–111
See application file for complete search history.

(56) References Cited

U.S. PATENT DOCUMENTS

| | | | | |
|---|---|---|---|---|
| 5,130,830 A * | 7/1992 | Fukushima et al. | ......... | 349/123 |
| 5,388,517 A * | 2/1995 | Levien | ......... | 101/485 |
| 5,703,668 A * | 12/1997 | Shin | ......... | 349/110 |
| 5,742,365 A * | 4/1998 | Seo | ......... | 349/43 |
| 6,074,725 A * | 6/2000 | Kennedy | ......... | 428/188 |
| 6,100,596 A * | 8/2000 | Daly et al. | ......... | 257/779 |
| 6,123,551 A * | 9/2000 | Westfall | ......... | 439/67 |
| 6,307,613 B1 * | 10/2001 | Iida | ......... | 349/158 |
| 6,373,548 B1 * | 4/2002 | Kim | ......... | 349/158 |
| 6,406,787 B1 * | 6/2002 | Rajan et al. | ......... | 428/349 |
| 6,468,638 B1 * | 10/2002 | Jacobsen et al. | ......... | 428/209 |
| 6,501,526 B1 * | 12/2002 | Oh | ......... | 349/155 |
| 6,545,730 B1 * | 4/2003 | Hwang | ......... | 349/43 |
| 6,649,952 B1 * | 11/2003 | Sawada | ......... | 257/294 |
| 6,650,053 B1 * | 11/2003 | Takada et al. | ......... | 313/586 |
| 6,665,044 B1 * | 12/2003 | Jacobsen et al. | ......... | 349/187 |
| 6,690,446 B1 * | 2/2004 | Okamoto et al. | ......... | 349/181 |
| 6,734,931 B1 * | 5/2004 | Yu | ......... | 349/106 |
| 6,803,975 B1 * | 10/2004 | Kim et al. | ......... | 349/43 |
| 2002/0196396 A1 * | 12/2002 | Sakamoto et al. | ......... | 349/113 |
| 2003/0020851 A1 * | 1/2003 | Kim et al. | ......... | 349/106 |

* cited by examiner

*Primary Examiner*—Tarifur R. Chowdhury
*Assistant Examiner*—Mike Qi
(74) *Attorney, Agent, or Firm*—McKenna Long & Aldridge LLP

(57) ABSTRACT

An align key device for a TOC/COT-type liquid crystal display (LCD) device having first and second substrates facing each other with a predetermined space therebetween, and a liquid crystal material layer disposed between the first and second substrates, includes a first align key formed on a non-active area of the first substrate, and a second align key formed on the second substrate facing and aligning with the first align key, the second align key being formed of silver paste.

13 Claims, 10 Drawing Sheets

US 7,102,724 B2

ALIGN KEY FOR A TOC/COT-TYPE LIQUID CRYSTAL DISPLAY DEVICE AND METHOD OF FABRICATING THE SAME

This application claims the benefit of Korean Patent Application No. 2001-84258 filed in Korea on Dec. 24, 2001, which is hereby incorporated by reference.

BACKGROUND OF THE INVENTION

1. Field of the Invention

The present invention relates to a liquid crystal display (LCD) device and a method of fabricating the same, and more particularly, to an align key for thin film transistor on a color filter (TOC)-type or color filter on thin film transistor (COT)-type LCD device and method of fabricating the same.

2. Discussion of the Related Art

As the information age rapidly evolves, a necessity for a flat panel display, which has advantages such as being thin, being lightweight, and having lower power consumption, has been increased. Liquid crystal display (LCD) devices are actively applied to notebook computers and desktop monitors, because of their superiority in resolution, display of color images and displaying quality. For example, active matrix liquid crystal display (AMLCD) devices, in which the thin film transistors and the pixel electrodes are arranged in the form of a matrix, are widely used because of their high resolution and superiority in displaying moving images.

In general, an LCD device is fabricated through an array substrate forming process, a color filter substrate forming process, and a liquid crystal cell forming process. A thin film transistor and a pixel electrode are formed in the array substrate forming process, and a color filter and a common electrode are formed in the color filter substrate forming process. Liquid crystal material is then injected between the array and color filter substrates in the liquid crystal cell forming process. The liquid crystal cell forming process commonly comprises an alignment layer forming process, a cell gap forming process, assembling process, a cell cutting process, and a liquid crystal injection process.

FIG. 1 is a cross-sectional view of a liquid crystal display (LCD) device according to the related art. In FIG. 1, an LCD device includes upper and lower substrates 10 and 30 spaced apart from each other with a predetermined space therebetween, and a liquid crystal material layer 50 disposed between the upper and lower substrates 10 and 30. A gate electrode 32 and a gate insulating layer 34 are sequentially formed on a transparent substrate 1 of the lower substrate 30. In addition, a semiconductor layer 36, which has an active layer 36a and an ohmic contact layer 36b, is formed over the gate electrode 32. Source and drain electrodes 38 and 40 are then formed spaced apart from each other on the semiconductor layer 36. A channel ch exposing a portion of the active layer 36a is formed between the source and drain electrodes 38 and 40. The gate electrode 32, the semiconductor layer 36, the channel ch, and the source and drain electrodes 38 and 40 form a thin film transistor T.

Furthermore, a gate line (not shown) is formed in a first direction connected to the gate electrode 32, and a data line (not shown) is formed in a second direction connected to the source electrode 38, such that the data line is perpendicular to the gate line. The data line defines a pixel region P by crossing the gate line. In addition, a passivation layer 42, which has a drain contact hole 44, is formed on the thin film transistor T. A pixel electrode 48, which contacts the drain electrode 40 through the drain contact hole 44, is formed in the pixel region P. A color filter 14, which filters light of a particular wavelength range, is formed beneath a transparent substrate 1 of the upper substrate 10.

Moreover, a black matrix 12 is formed in a boundary between each pixel region P to prevent a light leakage in the thin film transistor T region and an incoming of light into the thin film transistor T. A common electrode 16 is formed beneath the color filter 14 and the black matrix 12 to apply voltage to the liquid crystal layer 50. In addition, a seal pattern 52 is formed along edges of the first and second substrates 10 and 30 to prevent leakage of the liquid crystal between the first and second substrates 10 and 30. The seal pattern 52 is formed before the assembling process of the first and second substrates 10 and 30. Furthermore, the seal pattern 52 keeps a constant cell gap distance, thereby making the liquid crystal material injection process easier and preventing any injected liquid crystal material from leaking.

The LCD device further has alignment layers (not shown) between the upper substrate 10 and the liquid crystal layer 50, and between the lower substrate 30 and the liquid crystal layer 50. An aligning error margin for the assembling process of the first and second substrates 10 and 30 is commonly less than a few micrometers. However, if the upper and lower substrates 10 and 30 are aligned and attached with an aligning margin larger than the error margin of a few micrometers, display quality of the liquid crystal display deteriorates due to a light leakage during operation of the liquid crystal cell.

Furthermore, as the liquid crystal display (LCD) device becomes more and more integrated to display high quality images, space between elements becomes narrower. Accordingly, if there is a minor assembling error and thus an element is disposed in a position other than an initially designed position, a color reproduction quality is deteriorated.

Moreover, an LCD device, which has a structure wherein the color filter and the thin film transistor are formed in separate substrates, has the following disadvantages. First, assembling accuracy and aperture ratio may be decreased due to the misalignment of the array and color filter substrates. Second, if the assembling margin is reduced to increase the aperture ratio, light leakage phenomenon may occur. Third, because the color filter substrate and the array substrate should be formed in separate processes, it takes a long time to manufacture a liquid crystal panel. Thus, a TOC/COT-type LCD device has been suggested, wherein the thin film transistor and the color filter are formed in the same substrate.

FIG. 2 is a cross-sectional view of a TOC/COT-type LCD device according to the related art. In FIG. 2, a liquid crystal layer 90 is disposed between upper and lower substrates 60 and 70. A color filter 72 is formed on a transparent substrate 1 of the lower substrate 70. In addition, a flattening layer 74 is formed in each boundary for each color of the color filter 72 and on the color filter 72. An array element I is formed on the flattening layer 74, wherein the array element I has a thin film transistor T and a pixel electrode 78. Furthermore, a black matrix 62 is formed beneath the upper substrate 60 corresponding to the thin film transistor T to prevent light from flowing into the thin film transistor T. A common electrode 64 is formed beneath the black matrix 62. Because the array element I is disposed over the color filter 72, the color filter 72 can be divided into sections for each color. Light leakage can be prevented by the electro lines of the array element I that is formed of opaque material.

FIG. 3A is a plan view of an upper substrate for a TOC/COT-type LCD device according to the related art, and FIG. 3B is a magnified view of an area IIIA of FIG. 3A. In FIG. 3A, the upper substrate 60 has an active area IIA and a non-active area IIB. The common electrode 64 is extended to a boundary region of the active area IIA and the non-active area IIB. The black matrix 62 is formed in each pixel region of the active area IIA corresponding to the thin film transistor T (not shown) of the lower substrate (not shown). Align keys 94 are formed with same material as the black matrix in each corner of the non-active area IIB. A seal pattern 92 having an injection hole 91 is formed along edges of the common electrode 64 to assemble the upper and lower substrates 60 and 70 and form a cell gap. In FIG. 3B, the seal pattern 92 has a concave portion IIIB that exposes a portion of the common electrode 64. A silver dot 93, which is formed with silver (Ag) paste, is formed on the common electrode 64 corresponding to the concave portion IIIB of the seal pattern 92. The silver dot 93 serves to connect the upper and lower substrates 60 and 70 electrically and generally is formed by a point dotting method using a dispenser.

As stated above, the manufacturing process for the upper substrate 60 of the TOC/COT-type LCD device is complex because the process includes many processes, such as forming the common electrode 64, forming the black matrix 62 and the align key 94 with organic material or metal material, forming the seal pattern 92 and forming the silver dot 93. If the black matrix 62 is formed on the upper substrate 60, an assembling accuracy of the upper and lower substrates 60 and 70 may be decreased owing to an aligning margin with the thin film transistor T on the lower substrate 70. If the aligning margin is decreased, light leakage current may occur. Besides, because the black matrix 62 and the align key is formed by a photolithographic masking process that comprises a coating process, a light exposure process, a developing process, and an etching process, an accuracy of the align key 94, which is usually formed to have scores of micrometers (μm) pattern, is decreased and production yield may be low.

SUMMARY OF THE INVENTION

Accordingly, the present invention is directed to an align key of a TOC/COT-type LCD device and a method of fabricating the same that substantially obviates one or more of problems due to limitations and disadvantages of the related art.

An object of the present invention is to provide TOC/COT-type LCD devices in which an align key for an upper substrate is formed of silver paste by a printing device such as an inkjet device.

Another object of the present invention is to provide TOC/COT-type LCD devices in which an align key for an upper substrate is formed of organic polymer by screen-print method.

Another object of the present invention is to provide a method of fabricating TOC/COT-type LCD devices in which an align key for an upper substrate is formed of silver paste by a printing device such as an inkjet device.

Another object of the present invention is to provide a method of fabricating TOC/COT-type LCD devices in which an align key for an upper substrate is formed of organic polymer by screen-print method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an align key device for a TOC/COT-type liquid crystal display (LCD) device having first and second substrates facing each other with a predetermined space therebetween, and a liquid crystal material layer disposed between the first and second substrates, includes a first align key formed on a non-active area of the first substrate, and a second align key formed on the second substrate facing and aligning with the first align key, the second align key being formed of silver paste.

In another aspect, a TOC/COT-type liquid crystal display (LCD) device includes a first substrate having an active area and a non-active area, wherein a thin film transistor, a pixel electrode and a color filter are formed thereon, a second substrate having a common electrode formed thereon, wherein the first and second substrates are facing each other at a predetermined space therebetween, a liquid crystal material layer disposed between the first and second substrates, a first align key formed on the non-active area of the first substrate, and a second align key formed on the second substrate facing and aligning with the first align key, the second align key being formed of silver paste.

In another aspect, an align key device for a TOC/COT-type liquid crystal display (LCD) device having first and second substrates facing each other with a predetermined space therebetween, and a liquid crystal material layer disposed between the first and second substrates, includes a first align key on a non-active area of the first substrate, and a second align key on the second substrate facing and aligning with the first align key, the second align key being formed of an organic polymer by a screen-print method.

In another aspect, a TOC/COT-type liquid crystal display (LCD) device, includes a first substrate having an active area, a non-active area, a thin film transistor, a pixel electrode and a color filter formed thereon, a second substrate having a common electrode formed thereon, wherein the first and second substrates face each other at a predetermined space therebetween, a liquid crystal layer disposed between the first and second substrates, a seal pattern in a boundary region of the active area and the non-active area, a first align key on the non-active area of the first substrate, and a second align key on the second substrate facing and aligning with the first align key, the second align key being formed of an organic polymer by a screen-print method.

In another aspect, a method of fabricating a TOC/COT-type liquid crystal display (LCD) device, includes forming a first substrate having an active area and a non-active area, wherein a thin film transistor, a pixel electrode, a color filter and a first align key are formed thereon within the non-active area, forming a second substrate having a common electrode formed thereon, arranging the second substrate facing the first substrate with a predetermined space therebetween, cleaning the first and second substrates, forming a second align key on the non-active area of the second substrate with silver paste, forming alignment layers respectively on the first and second substrates using the first and second align keys as a base, forming a seal pattern on one of the first and second substrates, dispensing spacers between the first and second substrates, assembling the first and second substrates using the first and second align keys as a base, cutting the assembled substrates into an individual liquid crystal cell, injecting liquid crystal material into the liquid crystal cell, and sealing the liquid crystal cell.

In another aspect, A method of fabricating a TOC/COT-type liquid crystal display (LCD) device, includes forming a first substrate having an active area and a non-active area, wherein a thin film transistor, a pixel electrode, a color filter and a first align key formed within the non-active area, forming a second substrate having a common electrode, arranging the second substrate facing the first substrate with a predetermined space therebetween, cleaning the first and second substrates, forming a second align key on the non-active area of the second substrate with an organic polymer by a screen mask, forming alignment layers respectively on the first and second substrates using the first and second align keys as a base, forming a seal pattern on the second substrate, dispensing spacers between the first and second substrates, assembling the first and second substrates using the first and second align keys as a base, cutting the assembled substrates into an individual liquid crystal cell, injecting liquid crystal material into the liquid crystal cell, and sealing the liquid crystal cell.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
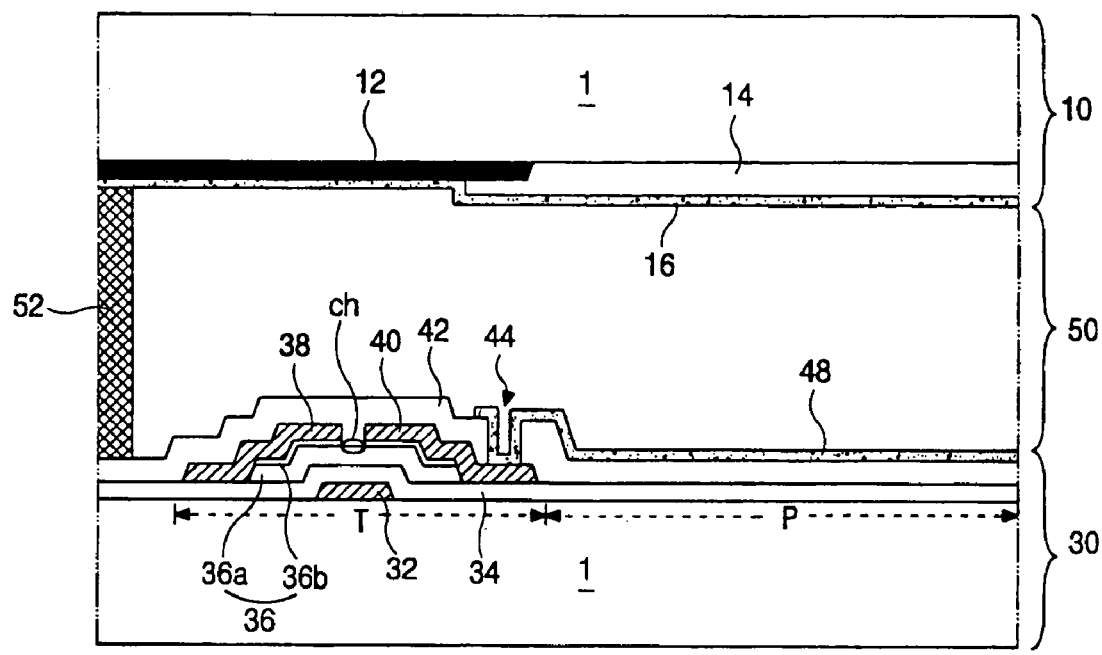
FIG. 1 is a cross-sectional view of a liquid crystal display (LCD) device according to the related art.
Figure 2:
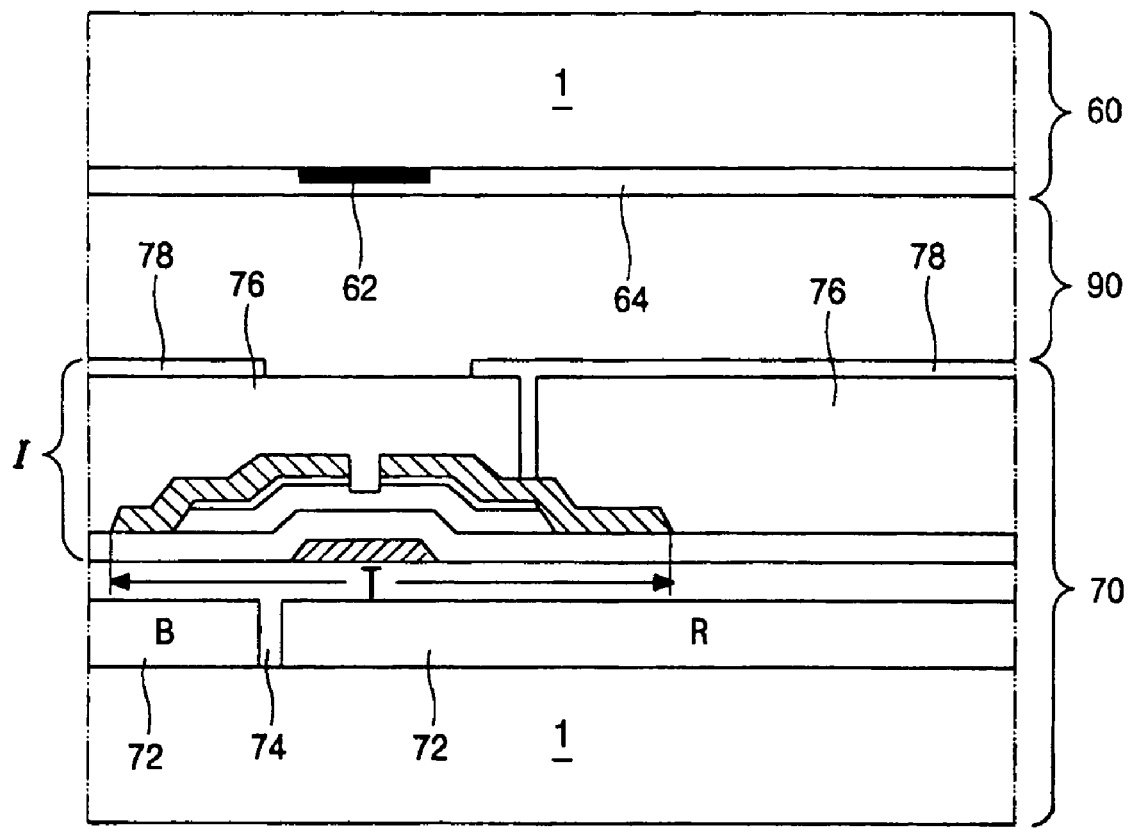
FIG. 2 is a cross-sectional view of a TOC/COT-type LCD device according to the related art.
Figure 3A:
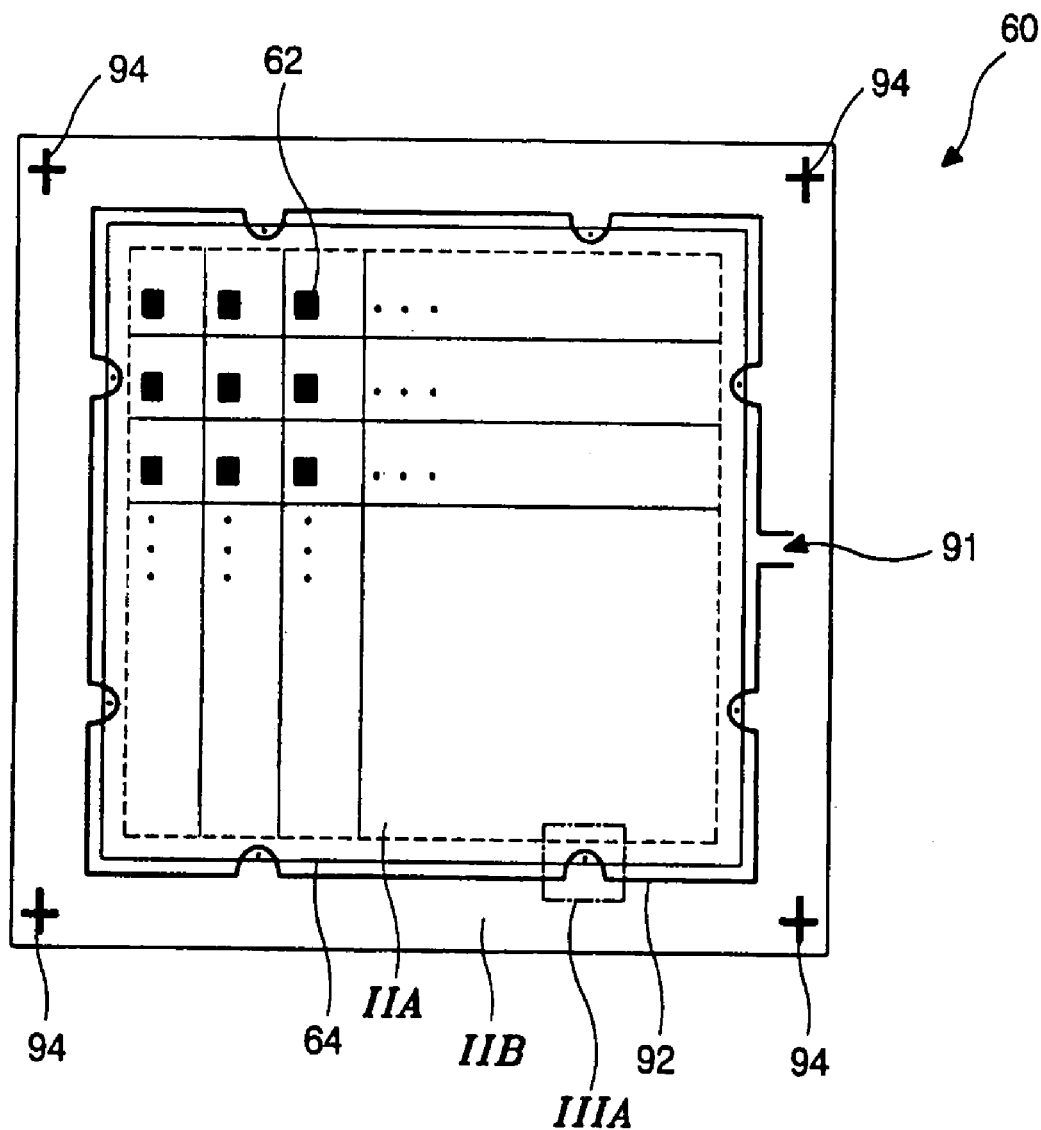
FIG. 3A is a plan view of an upper substrate for a TOC/COT-type LCD device according to the related art.
Figure 3B:
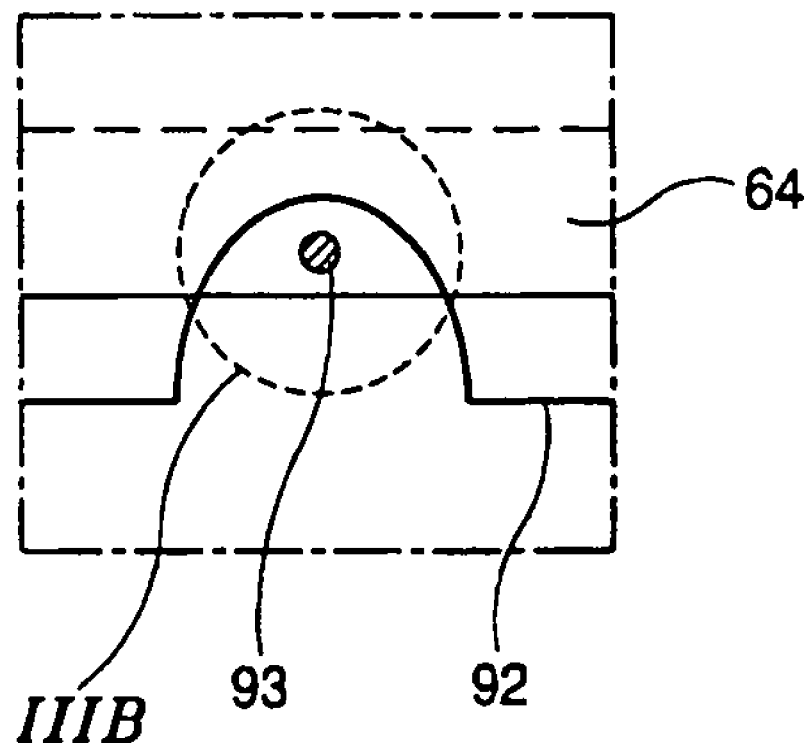
FIG. 3B is a magnified view of an area IIIA of FIG. 3A.
Figure 4:
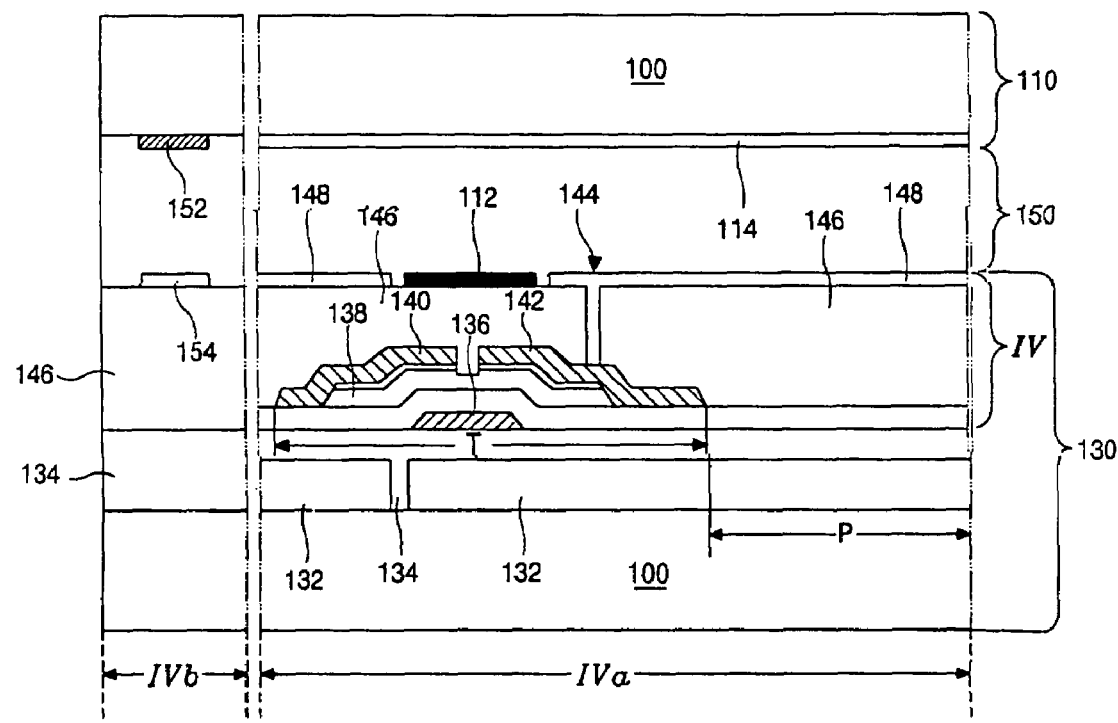
FIG. 4 is a cross-sectional view of an exemplary TOC/COT-type LCD device according to the present invention.

FIG. 4 is a cross-sectional view of an exemplary TOC/COT-type LCD device according to the present invention. In FIG. 4, an LCD device may include upper and lower substrates 110 and 130 having an active area IVa and a non-active area IVb, and spaced facing each other with a predetermined space therebetween, and a liquid crystal material layer 150 disposed between the upper and lower substrates 110 and 130. A common electrode 114 may be formed on the upper substrate 110, and a color filter 132 may be formed in the active area IVa on a transparent substrate 100 of the lower substrate 130. Also, a flattening layer 134 may be formed between each boundary of each pixel of the color filter 132 and on the color filter 132 to form a uniform surface on the lower substrate 130. A thin film transistor T having a gate electrode 136, a semiconductor layer 138, source and drain electrodes 140 and 142 may be formed on the flattening layer 134. A passivation layer 146 having a drain contact hole 144 may be formed on the thin film transistor T, and a black matrix 112 may be formed on the passivation layer 146 corresponding to the thin film transistor T.

In addition, a pixel electrode 148, which contacts the drain electrode 142 through the drain contact hole 144, may be formed of transparent conductive metal material on a pixel region P. The pixel electrode 148 and the color filter 132 may extend to an adjacent pixel region P to improve an aperture ratio. Furthermore, the pixel electrode 148 and the color filter 132 may not be confined to the above-mentioned structure. The color filter 132 may be formed by a dye method, an electrodeposition method, a pigment dispersion method or a print method. The flattening layer 134 and the passivation layer 146 may be formed of organic or inorganic material, such as benzocyclobutene (BCB) or acrylic resin that is superior in a flattening property. The black matrix 112 and the thin film transistor T may be formed in a same substrate. For example, the black matrix 112 may be formed on the passivation layer 146 before the formation of the pixel electrode 148. The black matrix 112 may be made of a black resin material.

Furthermore, upper and lower align keys 152 and 154 may be respectively formed on an inner surface of the upper and lower substrates 110 and 130 in the non-active area IVb. The upper align key 152 may correspond to the lower align key 154. Also, the lower align key 154 may be formed during the formation of array elements and the upper align key 152 by a printing apparatus using silver (Ag) paste or screen mask apparatus using organic polymer. The printing apparatus may include an inkjet apparatus of a roller, and the screen mask apparatus may include a high-resolution mask apparatus. The silver paste may be formed by depositing a mixture of silver powder, inorganic bonding agent and organic bonding agent on ceramic and then sintering it. In addition, the organic polymer may be formed using one of sealant, epoxy resin, acryl resin and photoresist. Moreover, the upper align key 152 may be formed with silver paste to serve as a silver dot (not shown).

Accordingly, the black matrix 112 may be formed in the lower substrate 130 on which the thin film transistor T is formed. In addition, the upper align key 152 may be formed on the upper substrate 110 with same material as the silver dot or the seal pattern without additional photolithographic masking process, thereby reducing an alignment margin of the upper and lower substrates 110 and 130, and simplifying a process of fabricating the upper substrate 110.

Figure 5:
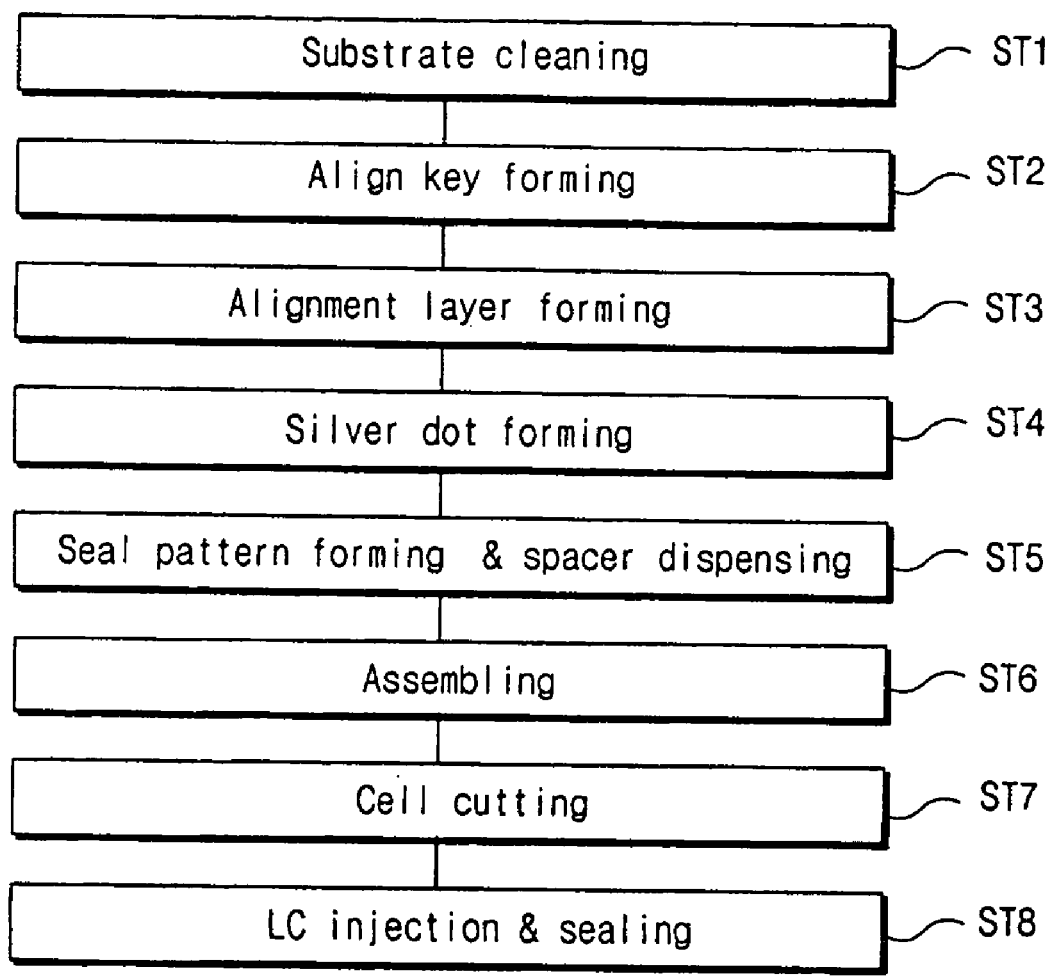
FIG. 5 is a flow chart illustrating an exemplary method of fabricating a liquid crystal cell for TOC/COT-type LCD devices according to the present invention.

FIG. 5 is a flow chart illustrating an exemplary method of fabricating a liquid crystal cell for TOC/COT-type LCD devices according to the present invention. In FIG. 5, ST1, a first substrate having a first align key, a color filter and all array elements formed thereon, and a second substrate having only a common electrode formed thereon may be cleaned to remove impurities on the substrates before forming an alignment layer on the substrates. In ST2, a second align key may be formed on the second substrate by a printing apparatus using silver paste. For example, the printing apparatus may include an inkjet apparatus or a roller.

In ST3, an alignment layer may be formed on the first and second substrates using the second align key as an alignment layer key. The alignment layer forming method may include printing the alignment layer, curing the alignment layer and rubbing the alignment layer. For example, the alignment layer may be formed of polymer thin film and may be printed on the first and second substrates. The printed alignment layer may be then cured as it passes through a preliminary drier and then an oven. Subsequently, a surface of the cured alignment layer may be then rubbed a certain direction with a rubbing fabric to align liquid crystal molecules in the rubbing direction.

In ST4, a silver dot may be formed with same material as the second align key on the second substrate. For example, the silver dot may be formed in an outer edge of the common electrode and serve to connect the first and second substrates electrically. The silver dot may be formed by the inkjet method as the second alignment key. Accordingly, because the second align key may be formed using the same material and apparatus as those of the silver dot, a production cost can be decreased and an assembling accuracy can be improved.

In ST5, a seal pattern may be formed, and spacers may be dispensed on the substrate. The seal pattern may form a gap for liquid crystal material injection and prevent the injected liquid crystal material from leaking. The seal pattern may be formed with a sealant material, such as thermosetting resin having glass fiber, by a screen-printing method. The spacers may keep a uniform gap between the first and second substrate, such that the LCD device has a uniform density. In addition, the spacers may be formed by a wet dispensing method in which a mixture of the spacers and alcohol is sprayed, or a dry dispensing method in which only the spacers are dispensed.

ST6, the first and second substrates may be assembled to be affixed to each other using the first and second align keys as an assembling key. The alignment degree of the first and second substrates may depend on a margin that is decided when the substrates are designed. For example, the aligning margin is usually about less than a few micrometers (μm). In ST7, the assembled substrates may be cut into a plurality of individual liquid crystal cells in a cutting process. The cutting process may include scribing the substrates to form cutting lines, and breaking the substrates along the scribed lines to form the individual liquid crystal cells. For example, a diamond pen or a cutting wheel formed of tungsten carbide may be used for scribing.

In ST8, a liquid crystal material may be injected into each of the individual liquid crystal cells through an injection hole. Since each of the individual liquid crystal cells has a gap ratio of only a few micrometers per hundreds of square centimeters ($cm^2$) in its substrate surface area, a vacuum injection process utilizing a pressure difference may be used. After the liquid crystal injection process, the injection hole may be sealed with an end seal. Thereafter, the liquid crystal cell, which underwent all of the above steps, may be inspected and then a polarizer may be formed on an outer side of the liquid crystal cell. Accordingly, the LCD device may be completed by attaching a driving circuit to the liquid crystal cell.

Figure 6:
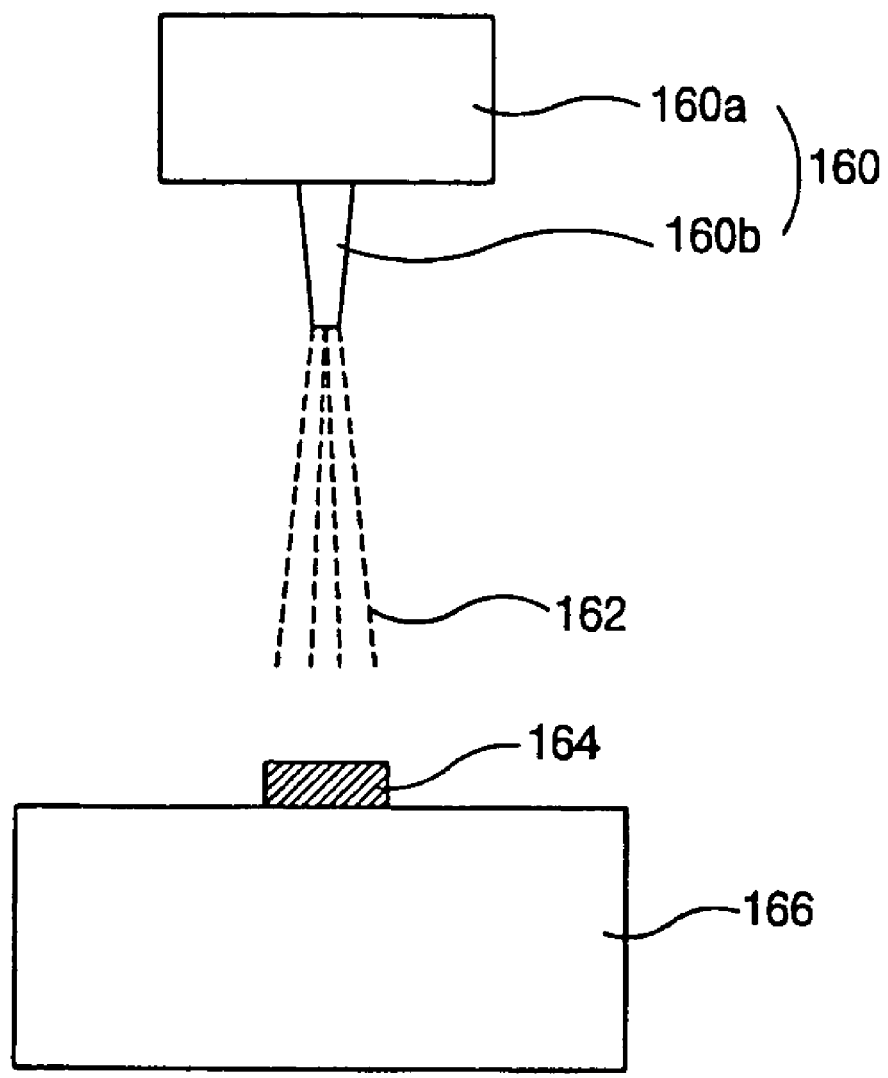
FIG. 6 is a schematic diagram illustrating an exemplary method of fabricating an align key using an inkjet device according to the present invention.

FIG. 6 is a schematic diagram illustrating an exemplary method of fabricating an align key using an inkjet device according to the present invention. In FIG. 6, an inkjet device 160 may include an inkjet head 160a and a nozzle 160b. For example, the inkjet head 160a may contain silver paste 162, and the inkjet head 160a may jet the silver paste through the nozzle 160b. An align key 164 may be formed by disposing the inkjet device 160 over a substrate 166 and then jetting the silver paste into the substrate 166 through the nozzle 160b. The inkjet head 160a further comprises an oscillator (not shown) generating vibrations at a constant frequency, and an oscillating plate (not shown) having a constant frequency to control an amount of silver paste being jetted through the nozzle 160b. Accordingly, a minute pattern of the align key in a range of a few micrometers (μm) may be formed.

Figure 7:
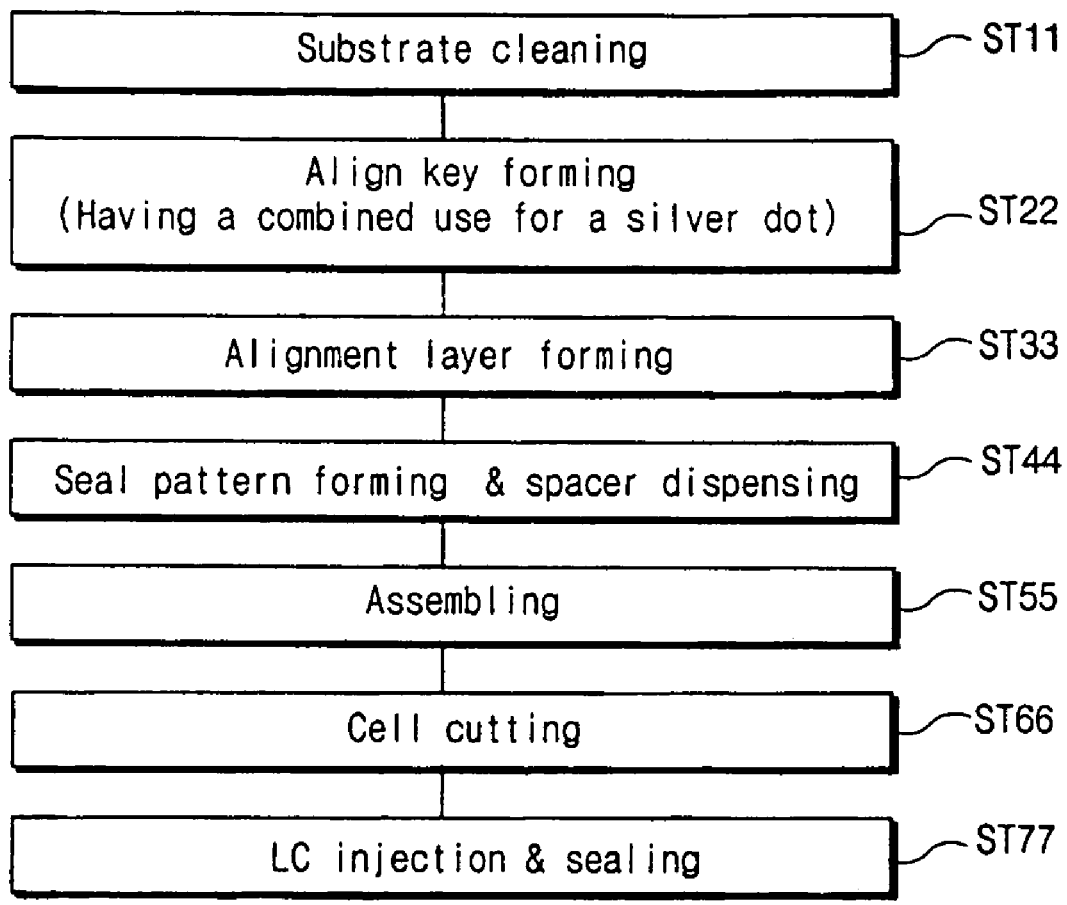
FIG. 7 is a flow chart illustrating another exemplary method of fabricating a liquid crystal cell for TOC/COT-type LCD devices according to the present invention.

FIG. 7 is a flow chart illustrating another exemplary method of fabricating a liquid crystal cell for TOC/COT-type LCD devices according to the present invention. In FIG. 7, ST11, a first substrate having a first align key, a color filter, and other array elements formed thereon, and a second substrate having a common electrode formed therein may be cleaned. In ST22, a second align key having a combined use for an align key and a silver dot may be formed on the second substrate in a position where the silver dot is to be formed. Accordingly, it is important that the first align key should be formed in a position corresponding to the second align key.

In ST33, an alignment layer may be formed. The alignment layer may be formed using a low temperature alignment layer forming process. In addition, in ST44, a seal pattern may be formed and spacers may be dispensed. In ST55, the first and second substrates may be assembled to be affixed to each other. In ST66, the assembled substrates may be cut into a plurality of individual liquid crystal cells. Then, in ST77, a liquid crystal material may be injected into the individual liquid crystal cell through an injection hole, such that the injection hole may be sealed after the injection of the liquid crystal material. Then, the liquid crystal cell may undergo an inspection process and then a polarizer may be formed on an outer surface of the liquid crystal cell. Accordingly, an LCD device may be completed by attaching a driving circuit to the liquid crystal cell. Furthermore, since the second align key may serve as the silver dot, an additional process for forming the silver dot is unnecessary.

Figure 8:
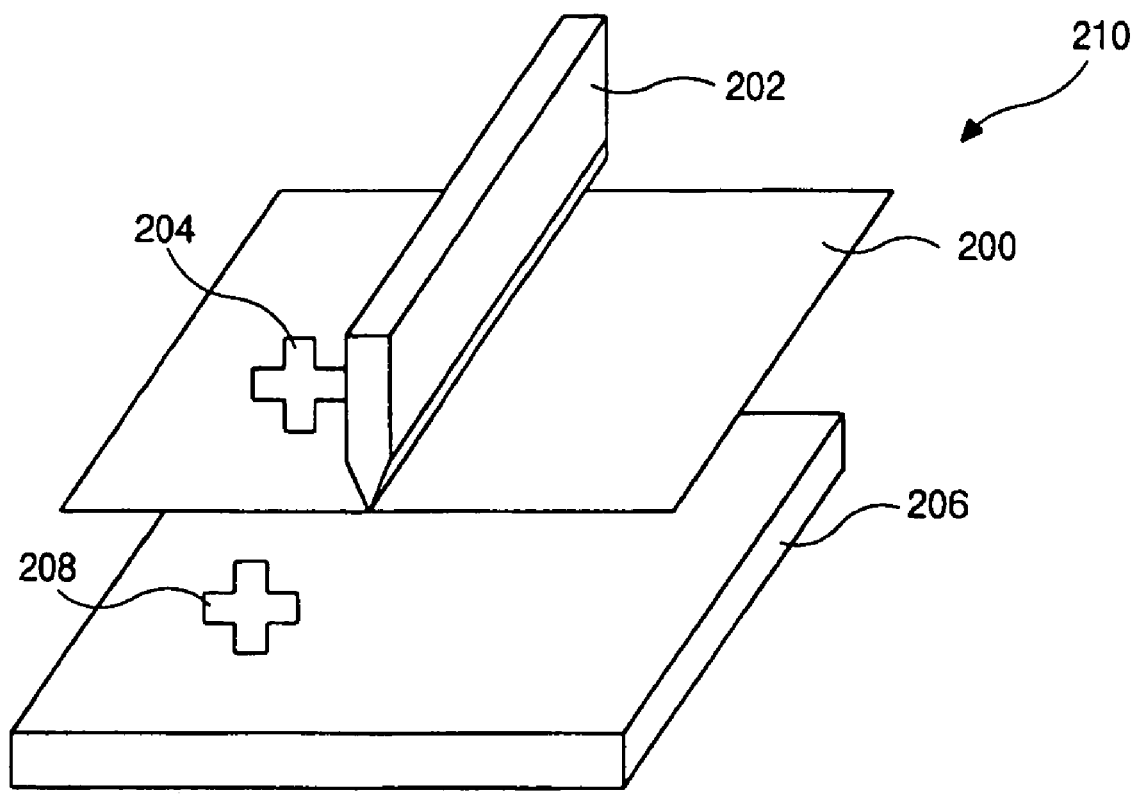
FIG. 8 is a schematic diagram illustrating another exemplary method of fabricating align key using a screen-print method according to the present invention.

FIG. 8 is a schematic diagram illustrating another exemplary method of fabricating align key using a screen-print method according to the present invention. In FIG. 8, a screen-print device 210 may include a screen mask 200 on which a certain pattern 204 is formed and a squeegee 202, such the squeegee 202 may be drawn across a surface of the screen mask 200 to facilitate printing of the pattern 204. An align key 208 may be formed on a substrate 206. The align key 208 may be used for printing an alignment layer, printing a seal pattern or assembling the substrates. The screen mask 200 may have a higher resolution than a mask that is generally used for a seal pattern. For example, the screen mask 200 may have meshes density between about 350 and about 500 mesh, and a thickness of an emulsion for the mask be between about 10 μm and about 25 μm. The align key 208 may be formed of thermosetting resin that contains glass fiber and is used for the seal pattern. Alternatively, the align key 208 may be formed one of epoxy resin, acryl resin and photoresist when another screen mask, which is different from that of the seal pattern, is used. If the align key is formed by the screen-print method, the align key may be formed with same material and apparatus as those of the seal pattern, thereby simplifying the fabricating process.

Figure 9:
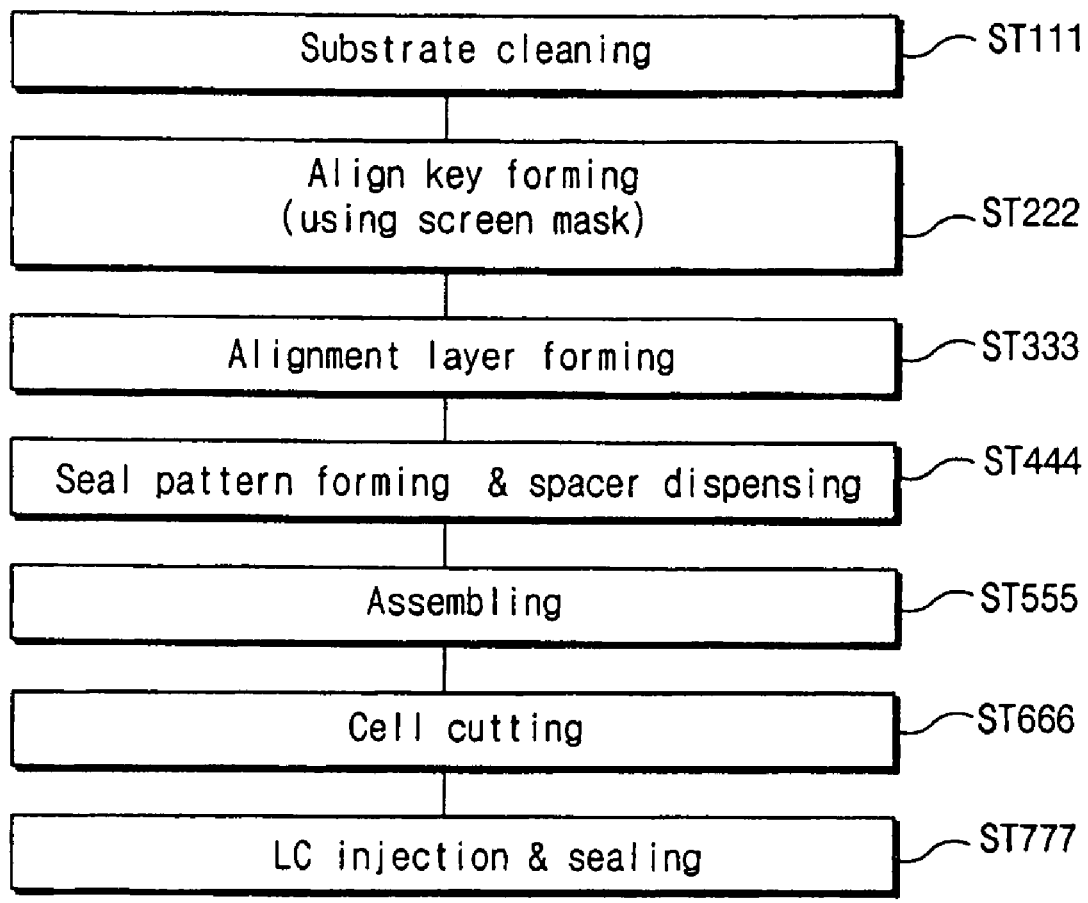
FIG. 9 is a flow chart illustrating another exemplary method of fabricating a liquid crystal cell for TOC/COT-type LCD devices according to the present invention.

FIG. 9 is a flow chart illustrating another exemplary method of fabricating a liquid crystal cell for TOC/COT-type LCD devices according to the present invention. In FIG. 9, ST111, a first substrate having a first align key, a color filter and other array elements formed thereon and a second substrate having a common electrode formed thereon may be cleaned. In ST222, a second align key may be formed on one of the first and second substrates using the screen mask. The second align key may be formed of a sealant material used for a seal pattern or an organic polymer material that is suitable for a screen-print method. In addition, the screen mask may have a high resolution. In ST333, an alignment layer may be formed on the first and second substrates. In ST444, a seal pattern may be formed and spacers may be dispensed between the first and second substrates. In ST555, the first and second substrates may be assembled to be affixed to each other. In ST666, the assembled substrates may be cut into a plurality of individual liquid crystal cells. In ST777, a liquid crystal material may be injected into the individual liquid crystal cells through an injection hole, such that the injection hole may be sealed after the injection. Thereafter, the liquid crystal cells may undergo an inspection process (not shown), and a polarizer may be formed on an outer surface of each of the liquid crystal cells. Furthermore, a driving circuit may be attached to each of the individual liquid crystal cell to form a LCD device.

Although the aforementioned embodiments describe a TOC-type LCD device, a COT-type LCD device may be similarly formed, except that the color filter is formed over the thin film transistor.

The aforementioned embodiments have the following advantages. First, a method of fabricating a second substrate may be simplified. Second, an accuracy of an align key, which is a minute pattern, can be improved. Third, cost for an investment of an apparatus and material can be reduced and a production yield can be increased by omitting a photolithographic mask process during forming the second substrate.

It will be apparent to those skilled in the art that various modifications and variations can be made in the align key for a TOC/COT-type liquid crystal display device and the method of fabricating the same of the present invention without departing from the spirit or scope of the invention. Thus, it is intended that the present invention cover the modifications and variations of this invention provided they come within the scope of the appended claims and their equivalents.

What is claimed is:

1. An align key device for a TOC/COT-type liquid crystal display (LCD) device having first and second substrates facing each other with a predetermined space therebetween, and a+ liquid crystal material layer disposed between the first and second substrates, wherein the first substrate having a thin film transistor, a pixel electrode, a color filter, a passivation layer on the thin film transistor above the color filter, and a black matrix on the passivation layer corresponding to the thin film transistor, comprising:

a first align key formed on a non-active area of the first substrate; and a second align key formed on the second substrate facing and aligning with the first align key, the second align key being formed of silver paste and formed by an inkjet device, wherein the first align key does not contact the second align key.

2. The device according to claim 1, wherein the first and second align keys have substantially same shapes.

3. A TOC/COT-type liquid crystal display (LCD) device, comprising:

a first substrate having an active area and a non-active area, wherein a thin film transistor, a pixel electrode, a color filter, a passivation layer and a black matrix are formed thereon, wherein the passivation layer is formed on the thin film transistor above the color filter, and the black matrix is formed on the passivation layer corresponding to the thin film transistor;

a second substrate having a common electrode formed thereon, wherein the first and second substrates are facing each other at a predetermined space therebetween;

a liquid crystal material layer disposed between the first and second substrates;

a first align key formed on the non-active area of the first substrate; and a second align key formed on the second substrate facing and aligning with the first align key, the second align key being formed of silver paste and formed by an inkjet device, wherein the first align key does not contact the second align key.

4. The device according to claim 3, further comprising a seal pattern formed in a boundary region of the active area and the non-active area, wherein the seal pattern includes a plurality of concave portions that expose partial edge portions of the common electrode.

5. The device according to claim 4, further comprising a plurality of silver dots, which are formed using a same material as the second align key and formed on the common electrode adjacent to the concave portions.

6. The device according to claim 5, wherein the silver dots are formed by an inkjet device.

7. The device according to claim 3, wherein the second align key is formed on the common electrode adjacent to the concave portions, the second align key having a combined use as an align key and a silver dot.

8. The device according to claim 3, wherein the black matrix includes a black resin material.

9. The device according to claim 3, wherein the first and second align keys have substantially same shapes.

10. A method of fabricating a TOC/COT-type liquid crystal display (LCD) device, comprising the steps of forming a first substrate having an active area and a non-active area, wherein a thin film transistor, a pixel electrode, a color filter, a passivation layer, a black matrix and a first align key are formed thereon, wherein the passivation layer is formed on the thin film transistor above the color filter, the black matrix is formed on the passivation layer corresponding to the thin film transistor, and the first align key is formed within the non-active area;

forming a second substrate having a common electrode formed thereon;

arranging the second substrate facing the first substrate with a predetermined space therebetween;

cleaning the first and second substrates;

forming a second align key by spraying silver paste on the non-active area of the second substrate using an inkjet device;

forming alignment layers respectively on the first and second substrates using the first and second align keys as a base;

forming a seal pattern on one of the first and second substrates;

dispensing spacers between the first and second substrates;

assembling the first and second substrates using the first and second align keys as a base such that the first align key does not contact the second align key;

cutting the assembled substrates into an individual liquid crystal cell;

injecting liquid crystal material into the liquid crystal cell; and sealing the liquid crystal cell.

11. The method according to claim 10, wherein the seal pattern is in a boundary region of the active area and the non-active area and has a plurality of concave portions that expose partial edge portions of the common electrode.

12. The method according to claim 11, further comprising a step of forming a plurality of silver dots on the common electrode adjacent to the concave portions with same material as the second align key before forming the seal pattern and dispensing spacers and after forming the alignment layer.

13. The method according to claim 10, wherein the first and second align keys have substantially same shapes.

* * * * *